(12) United States Patent
Edic et al.

(10) Patent No.: US 7,869,566 B2
(45) Date of Patent: Jan. 11, 2011

(54) INTEGRATED MULTI-SENSOR SYSTEMS FOR AND METHODS OF EXPLOSIVES DETECTION

(75) Inventors: Peter Michael Edic, Albany, NY (US); Mark E. Vermilyea, Niskayuna, NY (US); Forrest Frank Hopkins, Cohoes, NY (US); Geoffrey Harding, Hamburg (DE); Pierfrancesco Landolfi, Newark, CA (US)

(73) Assignee: Morpho Detection, Inc., Newark, CA (US)

( * ) Notice: Subject to any disclaimer, the term of this patent is extended or adjusted under 35 U.S.C. 154(b) by 86 days.

(21) Appl. No.: 11/771,289

(22) Filed: Jun. 29, 2007

(65) Prior Publication Data

US 2009/0003514 A1 Jan. 1, 2009

(51) Int. Cl.
*G01N 23/04* (2006.01)
(52) U.S. Cl. ...................................................... 378/57
(58) Field of Classification Search ................... 378/57, 378/9, 10, 20, 71, 82
See application file for complete search history.

(56) References Cited

U.S. PATENT DOCUMENTS

| | | | | |
|---|---|---|---|---|
| 4,709,382 A * | 11/1987 | Sones | ............................. | 378/5 |
| 5,007,072 A * | 4/1991 | Jenkins et al. | ................. | 378/57 |
| 5,608,776 A * | 3/1997 | Hsieh | .......................... | 378/145 |
| 5,642,393 A * | 6/1997 | Krug et al. | ..................... | 378/57 |
| 6,628,745 B1 | 9/2003 | Annis et al. | | |
| 6,839,406 B2 | 1/2005 | Ries et al. | | |
| 7,062,006 B1 * | 6/2006 | Pelc et al. | ..................... | 378/19 |
| 7,116,751 B2 | 10/2006 | Ellenbogen et al. | | |
| 7,151,817 B1 * | 12/2006 | Abraham et al. | .............. | 378/57 |
| 7,217,235 B2 * | 5/2007 | Kindlein et al. | ................ | 378/65 |
| 2005/0031069 A1 * | 2/2005 | Kaucic et al. | .................. | 378/19 |
| 2005/0047542 A1 * | 3/2005 | Chen | ........................... | 378/19 |
| 2005/0061985 A1 * | 3/2005 | Hoffman | ....................... | 378/19 |
| 2005/0111610 A1 * | 5/2005 | De Man et al. | ................ | 378/10 |
| 2005/0175151 A1 * | 8/2005 | Dunham et al. | ............. | 378/122 |
| 2005/0180542 A1 * | 8/2005 | Leue et al. | ..................... | 378/57 |
| 2005/0226375 A1 * | 10/2005 | Eberhard et al. | .............. | 378/62 |
| 2006/0098773 A1 * | 5/2006 | Peschmann | ................... | 378/57 |
| 2006/0104414 A1 * | 5/2006 | Mayo | ........................... | 378/57 |
| 2006/0109953 A1 * | 5/2006 | Walter et al. | .................... | 378/5 |
| 2006/0140340 A1 | 6/2006 | Kravis | | |
| 2006/0193434 A1 * | 8/2006 | Green | .......................... | 378/57 |

FOREIGN PATENT DOCUMENTS

WO 2006138529 12/2006

OTHER PUBLICATIONS

PCT International Search Report dated Apr. 9, 2009.
Habiger et al., "EXDEP/CTX: An Explosive Detection System for Screening Luggage With High Energy X-Rays", Proceedings of the Particle Accelerator Conference, San Francisco, CA, IEEE, vol. Conference 14, pp. 2622-2624, May 6, 1991.

\* cited by examiner

*Primary Examiner*—Chih-Cheng G Kao
(74) *Attorney, Agent, or Firm*—Armstrong Teasdale LLP

(57) ABSTRACT

An integrated, multi-sensor, Level 1 screening device is described, which system provides a next-generation Explosives Detection System (EDS) that enables high throughput, while drastically reducing false alarms. In exemplary embodiments, the present system comprises a non-rotational, Computed Tomography (CT) system and a non-translational, X-ray diffraction (XRD) system, both in an inline configuration.

28 Claims, 4 Drawing Sheets

FIG. 7

INTEGRATED MULTI-SENSOR SYSTEMS FOR AND METHODS OF EXPLOSIVES DETECTION

BACKGROUND

This disclosure relates generally to screening devices for explosives detection, and more particularly to an integrated, multi-sensor screening device for explosives detection that provides high throughput, while simultaneously achieving low false alarm rates.

Conventional systems provide alternate levels of screening capability via different screening devices. For example, a CT system will be employed as an initial, or Level 1, screening device. If a threat is detected and cannot be cleared by on-screen review, the baggage may proceed to a secondary, or Level 2, screening device, which may be an X-ray diffraction system. If the alarm cannot be resolved, it may be required to open the luggage to manually inspect the item that is producing the alarm and/or use trace detection techniques to clear the bag. Each advancing level of screening requires techniques that increase the level of manual manipulation and involvement. Conventional systems do not integrate the Level 1 screening devices with the subsequent levels of screening that may be required, hence adding a time delay in screening baggage and requiring a complicated baggage handling system.

What is needed in the art is an effective, integrated, multi-sensor Level 1 screening device to replace the multiple levels of screening that have been required to date.

SUMMARY

The above described and other problems and disadvantages of the prior art are overcome or alleviated by the present integrated, multi-sensor, Level 1 screening device. This system configuration provides an Explosives Detection System (EDS) that enables high throughput and maintains threat detection, while reducing false alarms.

In exemplary embodiments, the present system comprises a non-rotational, Computed Tomography (CT) system and a non-translational, X-ray diffraction (XRD) system, both in an inline configuration. The non-rotational, CT system incorporates a distributed X-ray source and detector, both configured to acquire energy-sensitive X-ray projection data, in a stationary configuration which reduces mechanical complexity of the gantry, reduces detector cost, and provides uniform imaging resolution throughout the imaging field of view (providing uniform threat detectability throughout the field of view). Conventional third-generation CT systems may also be utilized with the non-translational, XRD system in an inline configuration. Furthermore, it is not necessary that the CT system have spectral capability. However, in exemplary embodiments utilizing a spectral CT system, performance of the system may be enhanced relative to systems without spectral capability.

After processing data acquired with the CT system, the XRD system is queued to interrogate regions of interest (ROI) within the bag that are suspicious. The XRD system topology incorporates a distributed, non-translational X-ray source that provides inspection throughout the entire field of view. Without stopping or slowing the conveyor belt, X-ray diffraction information may be acquired from suspicious ROIs and is used to identify molecular signatures indicative of object type (threat or false alarm).

In exemplary embodiments using Spectral CT and XRD imaging technologies, automated threat detection, and a novel queuing technique, the new system will be capable of a scanning rate of 1000 bags per hour or more at an unprecedented false alarm rate. A Spectral CT system is one in which energy sensitive projection data is acquired, thereby augmenting the standard CT number reconstruction with information about material type (e.g. effective atomic number of the material).

The above described and other features are exemplified by the following figures and detailed description.

DETAILED DESCRIPTION

The presently described solution advantageously fuses data from multiple sensors, for example CT, energy discriminating X-ray detection, and X-ray diffraction (XRD) imaging, to meet desired detection and false alarm specifications. The generation of energy discrimination or energy sensitive information within the CT system concept is denoted as "Spectral CT"; this term has been used to represent the coalescence of both concepts. Moreover, the system topology represents a complete platform migration from rotational and translational technology to a totally stationary design, which represents a paradigm switch allowing the screeners to meet future requirements.

Novel, distributed X-ray source technology incorporated in a non-rotating system configuration, as described herein, provides dramatic improvement in image quality throughout the imaging field of view. This further provides uniform threat detectability throughout the imaging volume. Moreover, the exemplary system concept includes the fusion of multi-sensor information (for example, spectral CT and X-ray diffraction) to dramatically reduce false alarms relative to prior EDS. Accordingly, this exemplary design provides an inline solution, with all parts of the system operating with a constant conveyor belt speed. As a result, installation of these exemplary systems requires minimal impact on baggage handling systems as they are currently arranged.

Figure 1:
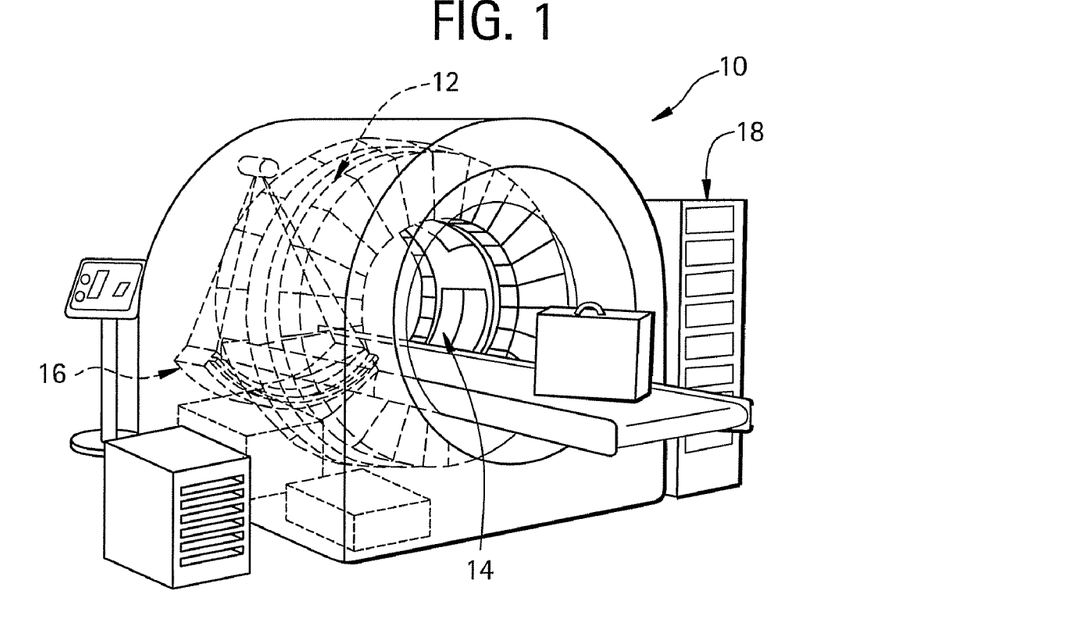
FIG. 1 is an explosives detection system in accordance with an exemplary embodiment of the invention.

Referring now to FIG. 1, an exemplary system topology is illustrated generally at 10. In such exemplary embodiment, the topology 10 comprises a volumetric imaging CT system. The CT system comprises a non-rotating gantry 12, which may be a distributed, stationary X-ray source and detector, and incorporates energy sensitive detectors 14 for Spectral CT. This has been disclosed in U.S. patent application Ser. No. 10/816,064, the entire contents of which are hereby incorporated by reference. The stationary CT system design mitigates deleterious blurring of objects that worsens towards the extent of the imaging field of view due to rotation of the source and detector during data acquisition for typical third-generation CT systems. The stationary topology 10 provides improved uniformity in spatial resolution throughout the entire imaging field of view, which results in uniform threat detectability throughout the volume of the bag.

One exemplary novel x-ray source for the presently described explosives detection system (EDS) for Level 1 detection comprises a non-rotating, distributed, multi-source tube for Computed Tomography (CT) imaging. Exemplary electron emitter architectures for the non-rotating X-ray source comprise: fixed beam (FB), magnetically steered beam (MSB) and electrostatically steered (ESB) beams. The exemplary fixed beam topology is designed to have a single electron emission site per required imaging focal spot; the latter two exemplary architectures will each have a smaller number of steerable electron beams that can be positioned at the desired location using beam controls and software.

Exemplary energy sensitive detectors 14 may be constructed from two layers of energy-integrating sensor technology. This topology allows simultaneous acquisition of spectral information, which mitigates issues incurred with designs that alternate high- and low-energy acquisitions. The main issue with designs that alternate high- and low-energy acquisitions is that slight misalignments along X-ray paths from the source to the detector will be masked as spectral information in the reconstructions of the effective atomic number within the imaging field of view. Other technologies for energy sensitive measurement include energy-sensitive, photon-counting detectors and novel beam filtering techniques, which could also be incorporated into the overall system concept described herein.

The XRD system 16 is configured inline with the Spectral CT system and is capable of maintaining inspection to meet the throughput requirement of at least 1000 bags per hour. To achieve this throughput, this system also comprises a distributed X-ray source that is capable of interrogating any region within the required imaging field of view to provide spectral diffraction signatures for subsequent threat classification.

An exemplary reconstruction engine employs helical reconstruction processes, for example utilizing helical cone-beam reconstruction, to reconstruct the entire volume of the baggage being inspected, at a resolution sufficient to meet detection requirements. The Spectral CT and XRD systems will acquire multi-sensor information, which may be combined as needed for automated explosives detection (AED). The need for helical scanning protocols for luggage scanning limits the utility of dual-kVp systems for spectral CT since the bag is moving longitudinally along the conveyor when each projection data are acquired (dual-kVp systems acquire projection data at two different operating voltages of the X-ray tube to acquire the energy-sensitive measurements).

In the exemplary embodiment illustrated at FIG. 1, the computing platforms for both reconstruction and AED are coupled at processor 18 (although this is not required). Coupling of the computing platforms for reconstruction and AED provides great advantages. In some instances, the AED may require better contrast-to-noise ratio for improved estimation of effective atomic number for a large object. A special request can be made to the reconstruction engine to modify the reconstruction kernel appropriately to improve the signal-to-noise ratio and regenerate the reconstructed region of interest. Conversely, the AED may require higher resolution for detection of thinner objects. Once again, a special request can be issued to the reconstruction engine to enhance higher spatial features for the specified region of interest. Both scenarios enhance the system's capability of appropriately classifying possible threats.

Various exemplary components of the presently described explosives detection system will be described in the sections that follow.

Spectral Computed Tomography(CT)

An exemplary CT system component of the explosives detection system comprises a non-rotating system. In such exemplary non-rotating system, all requisite projection data is acquired by electronically gating source locations within a distributed X-ray source that completely encircles the imaging field of view.

Figure 2:
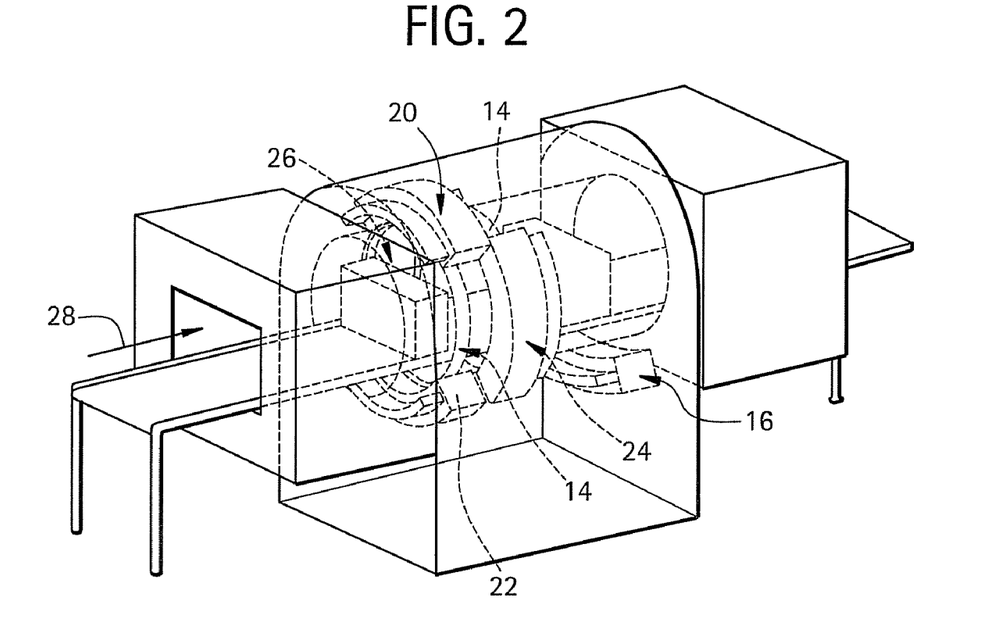
FIG. 2 is a partially transparent perspective view of staggered energy sensitive detectors and distributed X-ray source topology for CT and XRD in accordance with an exemplary embodiment of the invention.

Reference is made to FIG. 2, which illustrates an exemplary CT system, specifically illustrating individual sensors of non-rotating CT and non-translational XRD, both of which include energy sensitive detectors. To acquire projection data that is mathematically complete for image reconstruction, the distributed X-ray source comprises four arc sections providing an azimuthal coverage of 90 degrees each. The four arc sections are illustrated generally at 20, 22, 24 and 26. The number of arc sections and the azimuthal coverage provided by each arc is not restricted to be 4 and 90 respectively; these parameters are chosen to satisfy varying system requirements.

Note, however, that in the illustrated exemplary embodiment at FIG. 2, the sections are staggered along the direction of bag translation, which is shown by arrow 28. This configuration allows for great flexibility as to how the system is operated. Specifically, the source locations can be fired sequentially to mimic a helical scan. Also, one source location on each of the four arcs can be fired simultaneously (since they are staggered along the direction of bag travel) to mimic four interlaced helices. Alternatively, the sources can be fired in a random pattern to provide novel sampling schemes. This has been disclosed in U.S. patent application Ser. Nos. 11/726,023, 11/725,892, 11/725,876 and 11/725,891, the entire contents of which are hereby incorporated by reference.

Spectral CT is an imaging technique that augments the reconstruction of the distribution of linear attenuation coefficient within the imaging volume using standard CT principles with a map of the effective atomic number (denoted as effective "Z") within the same imaging volume.

Figure 3:
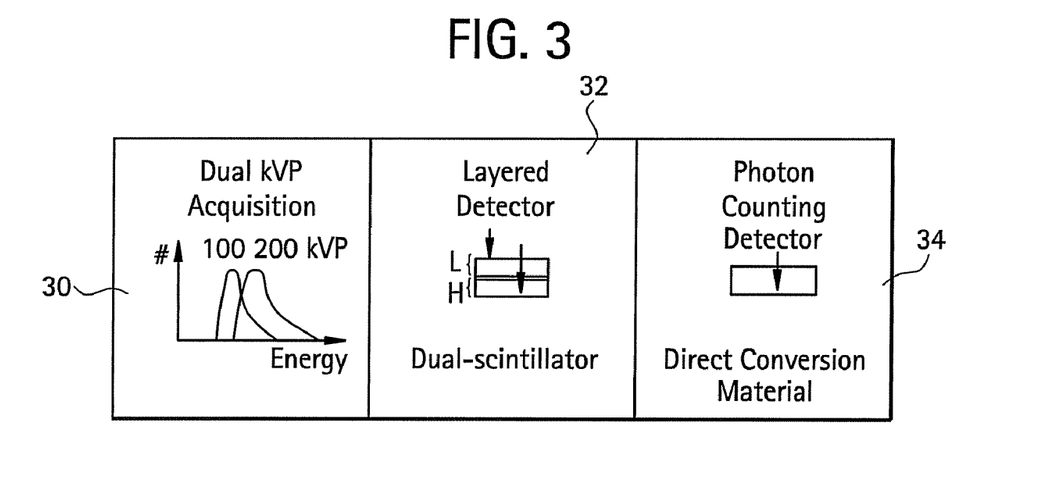
FIG. 3 illustrates three techniques for acquiring energy sensitive projection data suitable for Spectral CT in accordance with an exemplary embodiment of the invention.

Reference is made to FIG. 3, which illustrates three techniques for acquiring energy sensitive projection data suitable for Spectral CT: dual acquisition of projection data using different operating voltages of the X-ray tube 30 (dual k-Vp); simultaneous projection data acquisition with a layered, energy-integrating detector 32; and simultaneous acquisition using a photon-counting, energy-discriminating detector 34. X-ray source filtration techniques can also be utilized, but these provide another mechanism to shape the X-ray spectrum that impinges on an object, similar to dual-kVp methods.

FIG. 3 illustrates exemplary methods for acquired energy sensitive projection data suitable for decomposition into one or more sinograms that capture the effective "Z" information of the objects being scanned. Generally, for each system topology, the time required to achieve a given atomic number discrimination (as specified in the statistical uncertainty in the estimate) is inversely related to the tube power. Higher X-ray flux rate from the X-ray source allows shorter scan times per object. However, high flux rate may not be usable because of a detector saturation limit (e.g., limitations on the maximum flux rate that the energy-sensitive, photon-counting detector can accommodate), as described below for photon counting detector configurations. System designs with good separation between high- and low-energy bins yields higher throughput since shorter integration times are required to achieve the same discrimination capability in effective atomic number.

In exemplary embodiments, two acquisitions at different operating voltages of the X-ray tube (Dual-kVp Acquisition) are acceptable for acquiring the requisite projection data. However, a system concept using this method must contain multiple X-ray tubes with differing operating voltages or incorporate a means to rapidly switch the operating voltage of the tube. Dual-kVp Acquisition perform best when there is wide separation in operating tube voltages and when using axial scanning protocols (axial scanning protocols position the object with the field of view of the scanner, acquire projection data, step the object to a new position, acquire projection data, etc. until the entire object is scanned). To acquire the projection data required for spectral CT using dual-kVp acquisition and axial scanning protocols, the X-ray tube voltage is modified and another projection data set is acquired prior to stepping the object to a new location within the scanner.

Other acceptable exemplary methods for acquiring energy sensitive projection data focus on the detection subsystem, rather than complementary X-ray spectrum generation. Photon-counting detectors may utilize direct conversion material (for example Cadmium/Zinc/Telluride—CZT or Cadmium Telluride—CdTe) to convert X-ray photons into electrons, which are then collected by surrounding electrodes. The measured voltage corresponding to the collected electrons is indicative of the energy of the photon; hence, each photon's energy is estimated.

An alternate exemplary energy-sensitive detector configuration employs layered energy-integrating detector technology. In this configuration, the choice of scintillator material and its thickness affect the spectral deposition of energy in both detector layers. In one embodiment, the layer closest to the X-ray source detects low-energy X-rays, while the layer furthest from the X-ray source detects the remaining energy in the X-ray spectrum. This system configuration allows concurrent measurement of both high- and low-energy spectral data; however, the average energy separation of the projection data is reduced relative to photon-counting detector implementations.

The sections that follow describe the distributed X-ray source and the energy-sensitive detectors as components in presently described non-rotating Spectral CT system aspects. For exemplary embodiments, sections of both the distributed X-ray source and detector may be fabricated and incorporated into a bench-top system cable of full field-of-view imaging.

Distributed X-ray Source

In exemplary embodiments, a "fixed-beam" X-ray source, which employs a temporally controlled electron beam for each desired focal spot, is utilized. Such an exemplary configuration is advantageous from the perspective of cost, reliability, size, and speed.

Figure 4:
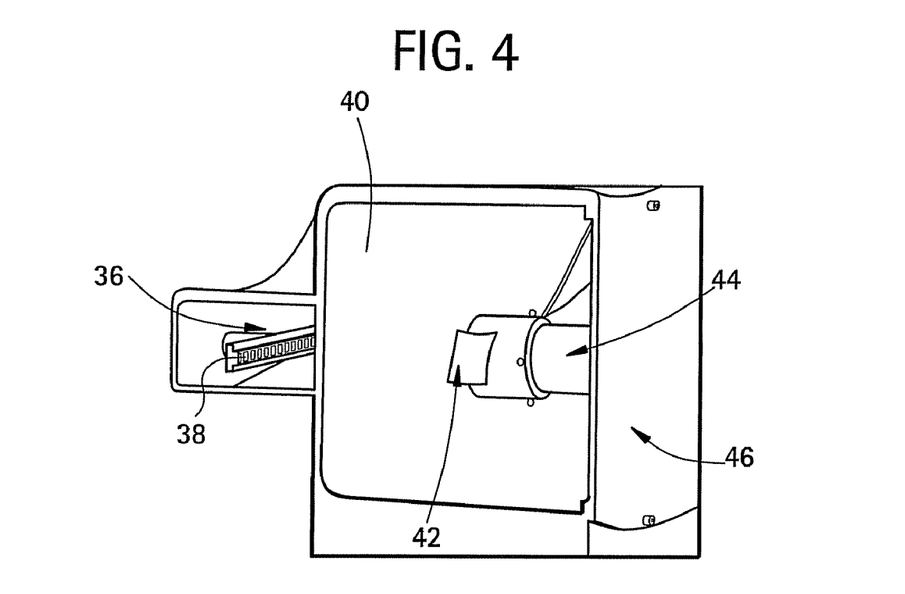
FIG. 4 is a perspective plan view of a distributed, fixed-beam X-ray source for CT in accordance with an exemplary embodiment of the invention.

Reference is made to FIG. 4, which illustrates a distributed, fixed-beam X-ray source for CT. The illustrated exemplary source includes a cathode 36, an emitter array 38, an aperture 40, an X-ray target 42, and high voltage insulator 44 provided within a vacuum vessel 46. The electron emitter array 38 comprises any suitable technology for electron emission, for example, thermionic emission devices, field emission devices, dispenser cathode devices, etc.

An exemplary X-ray source utilizes novel field emission technology for electron beam generation. Field emission (FE) devices based on carbon nanotubes provide several important advantages over conventional tungsten filaments and dispenser cathodes:

Require no heating current and operate close to room temperature, significantly simplifying both the control and electron gun design of the X-ray tube.

Are passively "off" when not subjected to an electric field, requiring an electrical field to turn "on", so the controls need only provide voltage that establishes the requisite electric field to a single channel at a time.

Hold promise of being less expensive than an alternate technology of dispenser cathodes or other thermionic emission devices.

Hold promise of being able to operate at higher partial pressures of oxygen, CO, and other reactive gases that will be present in an X-ray generating environment.

FEs may be fabricated as triodes, with integral gates microfabricated in close proximity to the emission surfaces, or as diodes, wherein external electrodes (gates) must be provided and positioned appropriately close to the emitting surfaces to limit the required voltage for switching the device.

Figure 5:
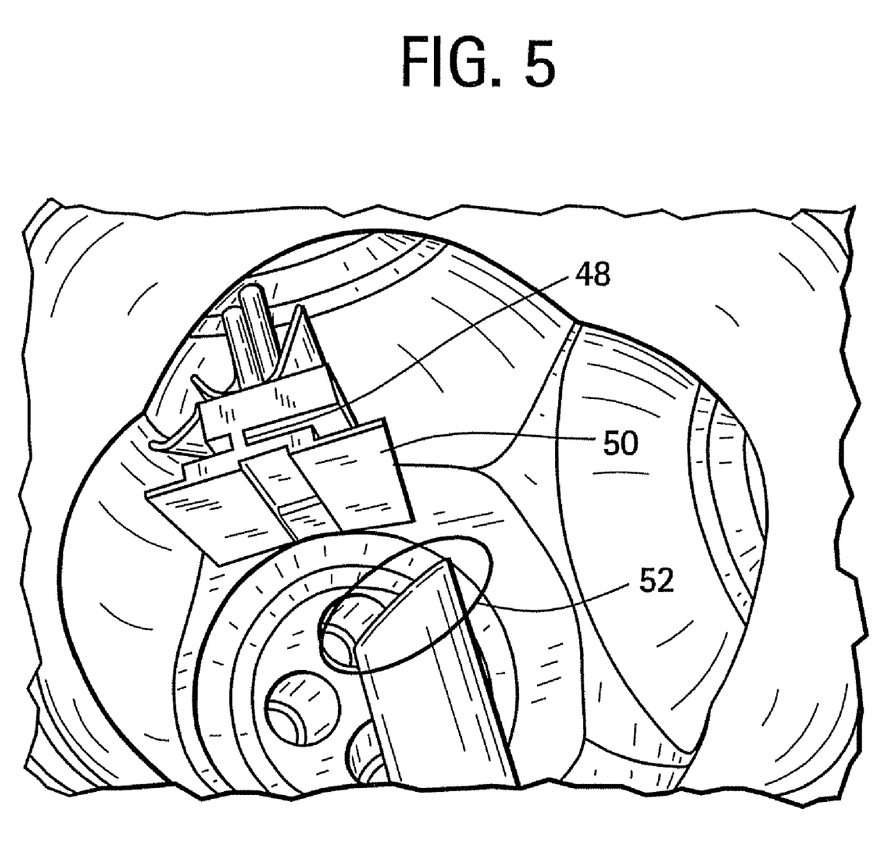
FIG. 5 is an elevation view of subsection of an exemplary emitter array in accordance with an exemplary embodiment of the invention.

In exemplary embodiments, the emitter 38 is placed in a structure to provide beam focusing as needed, as well as to provide protection from the potentially damaging environment of the X-ray source—with its combination of volatile gases and high voltage arc energy as has been disclosed in U.S. Pat. Nos. 7,203,269 and 7,218,700, the entire contents of which are hereby incorporated by reference. An exemplary design providing these features is illustrated in FIG. 5, including a cathode plate 48, an aperture plate 50, and a tungsten target 52 each operated to establish the electric field needed for field emission and X-ray generation. This illustrated exemplary embodiment is capable of sustained FE operation in the presence of high voltage discharges in the X-ray tube.

As part of the X-ray generation system, an exemplary emitter array 38 shown in FIG. 4 is provided with an associated set of high-speed switching control electronics to provide the gate voltage switchings at the required frequency and rise time to turn the devices "on" and "off". Moreover, the "fixed beam" topology is provided with a plurality of feedthroughs to the high vacuum environment where the emitters will be mounted (in exemplary embodiments, wireless serial links or multiplexing technology may be utilized to control large numbers of dedicated sources for large numbers of vacuum feed-throughs).

In other exemplary embodiments, the distributed X-ray source is enabled for a high-output pulsed distributed target. While conventional fixed-anode industrial X-ray tubes are limited to about 3 kW for a focal spot in the desired size range, exemplary embodiments of the present source pulse the spots at a low duty cycle, allowing for significantly increased instantaneous power rating per spot location.

In other exemplary embodiments, the cooling design is simplified from conventional high-output tubes, which require high heat transfer coefficients at the cooled surface to remove the heat. Since in exemplary embodiments, the target is much larger than a conventional target, the heat transfer coefficient may be reduced dramatically, allowing cooling with straightforward duct flow. Such a target, operated in a pulsed mode with a low duty cycle, can provide dramatically more power capability than a similar single-spot stationary anode.

Estimates of system-level reliability and resulting reliability requirements on the components of this complex X-ray source show that even a 1,200-emitter source can be viable, since several redundancy mechanisms may be incorporated in the design to allow for one or more failed components.

Energy Sensitive Detector

Exemplary embodiments of the presently described spectral CT provides atomic number resolution sufficient to create new diagnostic information and thereby reduce false alarms. As noted above, exemplary system designs include dual voltage operation of the X-ray tube (Dual-kVp Acquisition), the use of photon counting X-ray detectors, and the use of energy integrating detectors.

Given the throughput and reliability requirements of an explosives detection system, exemplary embodiments that are currently contemplated provide a layered detector design. This design represents in principle a tradeoff of system reliability, cost, and required system throughput. Also, other exemplary embodiments utilize photon-counting detectors. Since embodiments of the presently described Spectral CT provides a map of effective "Z" of scanned objects as additional information to the reconstructed linear attenuation value, this technology may provide additional information to help reduce the false alarm rate.

Data Calibration & Decomposition

In order to obtain the map of effective atomic number (effective "Z"), the presently described system generally provides a more accurate system calibration as compared to single measurement systems. In an exemplary embodiment, a calibration corrects for detector imperfections by generating and storing system calibration coefficients. These coefficients may be applied to the scanned projection data, measured by both detectors in a dual-layer design. The resultant data may be reconstructed to produce maps of effective "Z" or material composition.

Traditionally, the CT system is calibrated with water or water-like materials to remove beam hardening and detector imperfection. In most of existing EDS, such a calibration is very much simplified or sometime non-existent. However, without accurate system spectral calibration, the accuracy of the computed effective "Z" value cannot be guaranteed.

In exemplary embodiments of the presently described configuration, an advanced phantom-less spectral calibration may be employed. In exemplary embodiments, only "air" data needs to be collected at several operating voltages of the X-ray tube (minimum of two voltages) to obtain the most important detector characteristics. Using the "air" scan data, information can be obtained on the detection efficiency $\epsilon(E)$ of each detector channel as a function of incident x-ray photon energy E. The functional form $\epsilon(E)$ of each detector channel may be used to compute coefficients for basis material decomposition, then to obtain the map of effective "Z". The concepts for system calibration and material decomposition are described below.

System Calibration Algorithm

In an exemplary dual-layer detector system, for detector channel i, the measured signals in the first and the second layer are:

$$L1_V(i) = \int S_V(E,i)(1-d(E,i))\epsilon 1(E,i) dE \quad (1)$$

$$L2_V(i) = \int S_V(E,i) d(E,i) \epsilon 2(E,i) dE \quad (2)$$

Where, $S_V(E, i)$ is the incident X-ray spectrum at a given operating voltage of the X-ray tube, $d(E, i)$ is the X-ray attenuation due mainly to the scintillator in the first layer.

By expending $\epsilon(E, i)$ in polynomial forms, we have $$\epsilon 1(E, i) = x1_0(i) + x1_1(i)E + x1_2(i)E^2 + x1_3(i)*E^3,$$

$$\epsilon 2(E, i) = x2_0(i) + x2_1(i)E + x2_2(i)E^2 + x2_3(i)*E^3,$$

Thus, the equation (1) and (2) can be re-written as, $$L1_V(i) = a1_0(iv)x1_0(i) + a1_1(iv)x1_1(i) + a1_2(iv)x1_2(i) + a1_3(iv)x1_3(i) \quad (3)$$

$$L2_V(i) = a2_0(iv)x2_0(i) + a2_1(iv)x2_1(i) + a2_2(iv)x2_2(i) + a2_3(iv)x2_3(i) \quad (4)$$

This has been disclosed in U.S. Pat. No. 7,086,780, the entire contents of which are hereby incorporated by reference.

Equation (3) and (4) can be solved for all the X1's and X2's if the air data $L1_V(i)$, and $L2_V(i)$ are measured at 4 distinct operating voltages of the X-ray tube. With coefficients X's, the detector performance is appropriately captured.

Material Decomposition

With the measurement of $\epsilon 1(E, i)$ and $\epsilon 2(E, i)$ in the calibration process, we can compute the functional form or coefficients for obtaining the projection data for an arbitrary selection of basis materials—a stepping-stone to computing the map of effective "Z". In the following equations, p1 and p2 are projection data measured in the first and the second detector layers, respectively, $$d1 = f1(p1, p2)$$

$$d2 = f2(p1, p2)$$

where, d1 and d2 are integrated density along the same projection path as where p1 and p2 are collected, representing basis material 1 and material 2.

Functional forms f1( ) and f2( ) can be determined by simulation since each detector channel is well characterized; the forms can be further adjusted with a reduced set of physical measurements containing a combination of material 1 and material 2, if needed. This has been disclosed in U.S. Pat. No. 6,904,118, the entire contents of which are hereby incorporated by reference. Image Reconstruction An exemplary simultaneous acquisition of multiple rows of CT data in a single rotation of a CT gantry has had a dramatic impact on CT imaging by allowing a substantial reduction in the time required to acquire the requisite projection data. Since speed is a design goal for baggage scanning, it is advantageous to provide this approach. Unfortunately, if too many detector rows are added, the reconstruction process becomes more challenging since the X-ray paths emanating from the focal spot of the X-ray source toward the detector elements can no longer be considered as being "parallel" to the mid-plane of the imaging system.

Figure 6A:
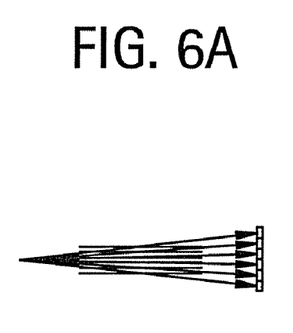
FIG. 6 illustrates complications of acquiring numerous rows of data using a single source as contrasted with use of multiple sources in accordance with an exemplary embodiment of the invention.

Exemplary CT scanner embodiments with 4, 8, and even 16 detector rows approximate the rays as parallel and may employ 2D reconstruction techniques (filtered back-projection), without significant loss in image quality. In exemplary design embodiments, four non-rotating, distributed X-ray sources may fire simultaneously—each onto a different collection of detectors. This topology increases the number of data rows that are acquired during a given time interval by a factor of four, without increasing the divergence of the x-ray paths (see FIG. 6). This has been disclosed in U.S. patent application Ser. Nos. 11/726,023, 11/725,892, 11/725,876, and 11/725,891, the entire contents of which are hereby incorporated by reference.

Figure 6B:
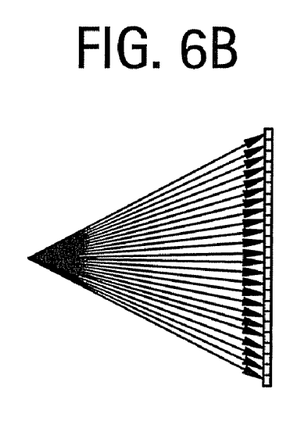
Figure 6C:
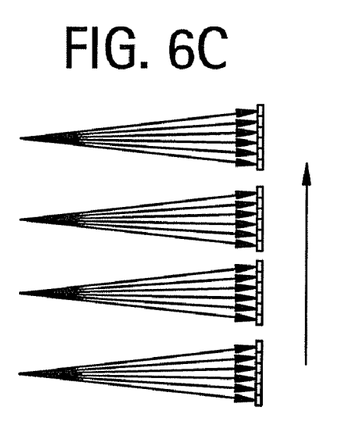

As noted above, and with reference to FIG. 6(a) several rows of data may be acquired simultaneously. With reference to FIG. 6(b), if the number of rows is high, throughput is increased, but the "parallel" beam approximation that allows 2D reconstruction will no longer be valid. With reference to FIG. 6(c) throughput can be increased without sacrificing reconstruction efficiency by incorporating multiple sources. The result is that the reconstruction can be simplified to a 2D problem while at the same time producing a high throughput.

An exemplary reconstruction process can be separated into two steps. In the first step, data interpolation is applied to convert the conebeam projections into a series of 2D sinograms—one for each slice in the volume to be reconstructed. Due to the acquisition procedure, conebeam projections are available for source points on four, interlaced helices for the exemplary embodiment shown in FIG. 2. For each helix, the source is large enough to produce 90 degrees of projection data for each image plane. Consequently, the data from the four interlaced helices can be combined to produce sinograms that cover a full 360-degree rotation about the object.

The second step of the exemplary reconstruction process utilizes a modified fanbeam filtered back-projection algorithm that is applied to each 2D sinogram. Since the fan angle of the system is relatively large, application of a traditional pixel driven fan beam filtered backprojection algorithm can result in an increase in noise and aliasing artifacts near the edge of the field of view in the reconstructed images. However, these effects may be mitigated, e.g., by distance driven back-projection. This has been disclosed in U.S. Pat. Nos. 6,724,856 and 7,227,982, the entire contents of which are hereby incorporated by reference.

While for computational efficiency reasons, 2D back-projection may be utilized in the reconstruction process. Reconstruction using a 3D back-projection process may also be used. Exemplary methods provide throughput capability that can accommodate higher throughput requirements. A first such exemplary method utilizes reconstruction of projection data from interlaced scan paths and is based on the Feldkamp/Davis/Kress conebeam reconstruction algorithm. A second such exemplary method utilizes projection data acquired from X-ray source locations sample that approximate a distributed surface source. This has been disclosed in U.S. patent application Ser. Nos. 11/726,023, 11/725,892, 11/725,876, and 11/725,891, the entire contents of which are hereby incorporated by reference.

In traditional rotating-source CT systems, the path of the X-ray focal spot relative to the object being scanned is a helix. However, the distributed X-ray source described herein provides the capability to fire the focal spots in an arbitrary order. This flexibility can be used to provide a much more gradual tradeoff between throughput and image quality. When the detector is too small to allow measurements of a given voxel from all possible view angles in a 360-degree span, the views that are missing may be spread uniformly around the span. For a helical acquisition, by contrast, the missing views would trace out a large sector and significant artifacts would result.

X-ray Diffraction(XRD)

Exemplary embodiments of the presently described XRD imaging system utilize a non-translational, distributed X-ray source. Such a system design provides increased accuracy, as well as faster and less bulky platforms relative to existing technology. Simultaneously, this system design dramatically reduces false alarms—reducing the screening provider's total cost of ownership.

XRD is a material-specific analysis technique that probes material structure on the molecular level. Momentum can only be transferred from the investigating photon beam to the sample when Bragg's law is fulfilled, $n\lambda = 2 \cdot d \cdot \sin(\theta)$, where n is the diffraction order, d is a lattice spacing, $\theta$ is the angle at which X-rays are incident on the sample and $\lambda$ is the photon wavelength. Exemplary embodiments may use energy-dispersive XRD, in which the angle of scatter, $\theta$, is held constant and the scatter intensity dependence on $\lambda$ is recorded with an energy-sensitive detector. Energy-dispersive XRD is much faster than angular-dispersive XRD where a pseudo-monochromatic X-ray source is used to probe the sample and standard energy-integrating detection technology is utilized to measure the spatial intensity distributed related to the diffraction signals.

An exemplary combination of appropriate collimation schemes for the primary and scattered beams with segmented semiconductor detectors permits simultaneous measurement of many diffraction profiles from varying depths in the suitcase thus providing a 4-D data set (3 space coordinates and 1 momentum transfer dimension). Such a system provides a high detection rate for organic and home-made explosives coupled with a low false alarm rate.

Figure 7:
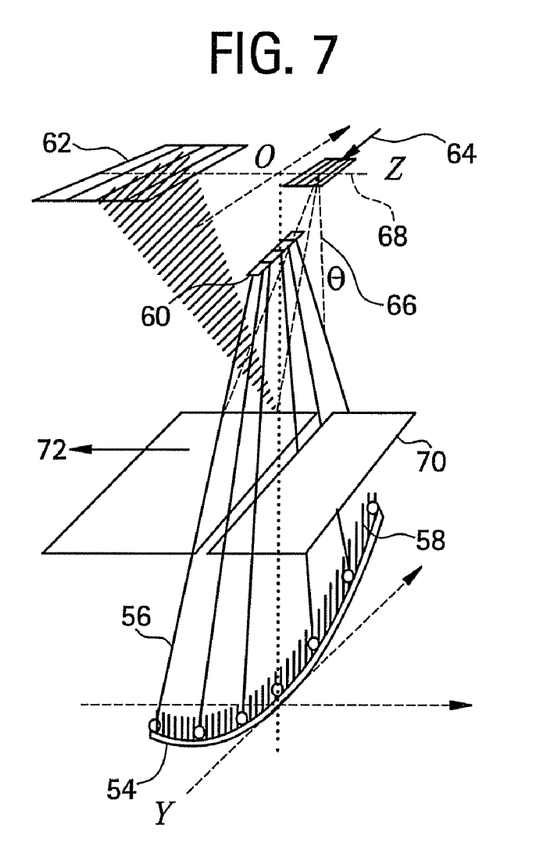
FIG. 7 is a perspective schematic view of a non-translation XRD system in accordance with an exemplary embodiment of the invention.

FIG. 7 illustrates an exemplary non-translational system concept depicted in U.S. Pat. No. 6,693,988, the entire contents of which are hereby incorporated by reference. This system comprises a multi-focus x-ray source 54, primary rays 56, a primary collimator 58, a transmission detector 60, a gamma camera detector 62 and a coherent scatter detector 64 detecting scatter rays 66. The gamma camera detector 62 is illustrated on a symmetry axis 68 common to the coherent scatter detector 64. Note conveyor belt 70 moving along axis of movement 72 between the source and the detectors.

The exemplary distributed X-ray source corresponds to an "inverse fanbeam" geometry (small detector and arc-shaped source), which combines inertia-less X-ray beam deflection with a compact collimator and detector arrangement. The exemplary X-ray source is distributed and allows inspection along any fanbeam section connecting the source to energy sensitive detector, which is collimated to segment the strip of the baggage under inspection.

Exemplary core components of the XRD system—the non-translational detector and distributed X-ray source—are discussed below along with other components of the system:

Gantry

In an exemplary embodiment, all of the components of the XRD system are mounted on a precision-machined steel gantry (not shown) that is stationary. Only the conveyor belt 70 moves during a scan. Components may be positioned with dowel pins and mounting holes such that they are pre-aligned and need no further adjustments. This exemplary arrangement further allows them to be swiftly exchanged (particularly modular X-ray sources) if replacement is required.

Primary Collimator

In the illustrated exemplary embodiment, x-rays that are emitted from the source 54 are focused by a bi-focal collimator 58 to two focus points coincident with the midpoint of the center location of the energy sensitive detectors. The primary beam is wedge-shaped and is deflected across the suitcase by appropriate choice of the activated X-ray tube. Once the coordinates of a region of interest (ROI) are known from the CT scan, the appropriate X-ray source may be electronically selected whose primary radiation beam most overlaps the centroid of the ROI position.

Secondary Collimator

An exemplary secondary collimator may provide the function of only allowing radiation at constant scatter angle from the primary X-ray beam to reach the detector in such a way that the depth coordinate of the scatter beam within the suitcase is coded onto the detector. The collimator may be manufactured from lead or tungsten alloys.

Distributed X-ray Source

An exemplary X-ray source assembly comprises 20 discrete stationary-anode X-ray tube heads that are powered by approximately 200 kV, 30 kW peak power HT generator and are selectively activated using a grid voltage supply. The overall operation is logically similar to that previously discussed.

Energy Sensitive Detector

In exemplary embodiments, small-angle X-ray scatter induced in the object by the primary beam is recorded in one of four segmented energy-sensitive detectors. Two detectors are positioned on one side of the primary beam plane, the other two symmetrically on the opposite side. The output of each detector segment is a pulse whose charge corresponds to the photon energy deposited in the detector. The detector pulse, which may be, e.g., approximately 3 microsecond (μs) duration, is routed through a pre-amplifier, shaping amplifier and analog-to-digital converter. After digitization, pulses from each detector segment may be fed to a 256-channel pulse height analyzer (PHA). The PHAs are read-out under computer control when the activated X-ray source is changed.

In exemplary embodiments, the presently described geometry is provided with an energy-sensitive detector having 3% full-width-at-half-maximum (FWHM) energy resolution at an energy of 60 keV, 75% detective quantum efficiency (DQE) at an energy of 150 keV and 40 linear segments of 0.7 mm pitch and 20 mm length. To meet these exemplary requirements and simultaneously relieve cost and maintenance concerns, instead of using, e.g., Germanium and its cryo-cooler, a Peltier-cooled "room temperature" semiconductor (for example Cadmium Telluride—CdTe) may be used.

Diffraction Profile Analysis Algorithms

Exemplary software may be utilized based in part on the Hindeleh-Johnson diffraction profile analysis method. Modules may include several pre-processing routines that correct for system-dependent and object-dependent data degradation effects. Moreover, the modules may compute such parameters for material characterization as:

Peak heights, widths and positions in the detected energy spectrum

Amorphous background functions

Crystallinity parameters

Effective atomic number and material densities.

The software may also include feature extraction algorithms, such as cross-correlation filtering. These techniques may be configured to reflect the fact that multi-attribute data is simultaneously available for material identification by statistical classifiers such as the minimum-distance classifier (MDC).

Concept of Operations

Certain exemplary aspects of the presently described multi-sensor, Level 1 screening system have been described in the sections above. This system comprises the integration of imaging technologies in an inline solution: CT, spectral information for effective "Z" determination; and XRD for molecular structure assessment. The following reviews the general concept of operations and exemplary techniques utilizing the multi-sensor information. Exemplary queuing of XRD by CT is followed by a discussion of exemplary techniques for multi-sensor fusion:

XRD Queuing by CT

There are several challenges for current, stand-alone XRD systems that limit their throughput capability. Since the XRD system is typically geographically separate from the CT system, an integrated pre-screener in the XRD system is required to acquire radiographic data that is used to register a bag being inspected to previously acquired CT data. This step is critical in that the threat location in the bag must be properly identified for XRD interrogation. Once the region of interest (ROI) is identified, the baggage must be moved into the XRD gantry and the X-ray source and collimator/detector arrangement mechanically positioned to traverse the ROI. Lastly, the XRD system illuminates the region with sufficient X-ray dose to allow further classification. The "system of systems" concept comprising a CTX9000 CT scanner and an XES 3500 XRD system, manufactured by GE Homeland Protection, Inc., is an example of such a product.

By contrast, the presently described concept is an inline configuration. Exemplary embodiments comprise an inline configuration of a non-rotational Spectral CT system and a non-translational XRD system. For example, once the bag is scanned with CT, it immediately enters the XRD system. The bag does not traverse several sections of the baggage handling system, which obviates the need for pre-screening and registration. Moreover, since in exemplary embodiments, the XRD comprises a non-translational X-ray source and "inverse fanbeam" geometry, every ROI within the bag can be interrogated without moving the X-ray source or detector. This technology enables a dramatic improvement in throughput. Finally, the co-location of the CT and the XRD sensors inside the same system, prevents the possibility of the baggage handling system (BHS) of mis-tracking the bags en-route from the CT to the XRD subsystems, which would significantly degrade the performance of the overall "system of systems".

Exemplary concepts of operation comprise:

The entire volume of the bag may be scanned and reconstructed.

Simple 2D segmentation techniques may be used to identify regions within each slice that are of a certain (threat) density.

As the bag traverses the XRD system, these ROIs may be rapidly and sequentially interrogated by electronic control of distributed source locations.

Once reconstruction of the entire volume of the bag is complete, 3D segmentation techniques may be used to identify suspicious volumes the molecular signature of the suspicious volumes are available for enhanced classification of these regions in the luggage.

Segmented (3D) Spectral CT information enables estimation of the object's density, mass, and effective "Z"; these three quantities and XRD information are available for further classification, as described below.

Sensor Fusion

Exemplary threat detection subsystems utilize reconstructed CT image data that has isotropic spatial resolution. In more technical terms, the system point-spread function and spatial sampling are similar in all dimensions. Furthermore, the spatial resolution may be sufficient to resolve the smallest salient feature size of objects in luggage, i.e. a resolution capable of detecting the thinnest sheet threats.

Utilizing data acquired with the Spectral CT system, maps of the object's density and effective "Z" may be computed. In exemplary embodiments, a map of the variance may be computed with a reconstructed CT image as well as disclosed in U.S. patent application Ser. No. 10/813,758, the entire contents of which are hereby incorporated by reference. The variance map is complementary to the density map: the density map is an estimate of the average density of each reconstructed voxel, while the variance map is an estimate of the variability within the same voxel. The variance map provides a measure of confidence for the reconstructed voxel value, either density or effective "Z". XRD information is also available for the ROI identified by the threat detection subsystem.

Technical Approach

In exemplary embodiments, the detection algorithm is fully three-dimensional for final evaluation of all threats. Separate algorithms may be used for detecting sheet and bulk objects, since sheet objects have one small dimension, and this fact can be exploited for more accurate segmentation.

Exemplary sheet segmentation may use a differential geometry tensor filter to enhance objects that are locally sheet-like. This filter improves the segmentation of sheet-like objects in luggage, even ones with high curvature, while providing a high degree of rejection of objects that are not sheet-like. In addition to the differential geometry filter, an exemplary connected components operator for sheet segmentation may use angular coherence instead of intensity similarity as disclosed in U.S. Pat. No. 7,031,430, the entire contents of which are hereby incorporated by reference.

Exemplary bulk segmentation may use a connected components algorithm using CT intensity as the similarity measure. Features may be extracted from both the sheet and bulk segmented objects: mass, density, and effective "Z". The variance of each of these measures may be computed using variance map information. For the effective "Z" maps, there is a good chance that some of the voxels will have contaminated "Z" information due to low photon flux caused by bag clutter. The variance maps can be used to identify voxels where this happens. In most cases, it is likely that the remaining voxels in objects will be sufficient to allow a single value of effective "Z" to be computed for the object as disclosed in U.S. patent application Ser. No. 10/813,758.

Exemplary classifiers may support multiple threat models. There may be different models for each explosive category, and possibly models for some material types within certain threat categories. The extracted features from objects may be used to fit the different models. In exemplary embodiments, a Bayesian voting algorithm may choose the threat model having the best fit, or a false alarm. The variance information that accompanies each extracted feature can be employed in choosing the model having the best fit.

Exemplary confidence intervals can also be defined for specifying, e.g., "definitely alarm", "no alarm", and "marginal" cases. If any object falls into the "definitely alarm" interval, the bag can be alarmed. If all objects fall into the "no alarm" interval, the bag can be cleared. If any objects fall into the "marginal" interval, a ROI can be computed for that object, and the previously acquired X-Ray diffraction information can be evaluated. The results ascertained from the diffraction profile analysis can then be fused with the detection results from the Spectral CT system using, e.g., a Bayesian combiner, and the "marginal" object can be reclassified as a threat or false alarm.

In exemplary embodiments, the XRD results may only be employed to resolve residual false alarms, and the detection rate (Pd) of the algorithm using the Spectral CT data should be high enough to tolerate a small loss in Pd caused by the XRD scans and still meet prescribed detection rates.

To date, there does not exist an integrated, multi-sensor, Level 1 screening device for explosives detection that provides high throughput, while simultaneously achieving low false alarm rates. The present system topology advantageously combines density and mass estimates of standard CT with effective atomic number estimates from Spectral CT and molecular structure from X-ray diffraction imaging, giving complementary information that results in dramatic reduction in false alarms at high throughput rates.

This inline system topology also advantageously obviates X-ray pre-scanners and associated bag registration techniques and the possibility of bags being mis-tracked by the BHS between Level 1 and Level 2 scanners. This topology reduces overall system cost and computational complexity.

The present system also advantageously provides Spectral CT imaging with uniform threat detectability throughout the imaging field of view. Exemplary non-rotational, distributed X-ray source and energy sensitive detectors provide uniform image quality throughout the imaging field of view. The stationary CT concept eliminates rotating components, so uniform resolution is achieved throughout the imaging field of view. The uniform resolution translates into uniform threat detectability.

The present system also advantageously provides ROI interrogation within baggage by XRD at high-throughput rates. Exemplary XRD systems comprise a non-translational, distributed X-ray source that enables interrogation of any ROI within the bag. The system topology eliminates the need to stop the conveyor belt for XRD detector/source positioning, thereby enabling a high-throughput system topology.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims. For example, the Spectral CT system may be a third-generation CT system, allowing integration of an inline solution, at reduced system performance. Moreover, the non-translational XRD system may comprise a system topology other than an inverse-geometry configuration, while still providing threat assessment capability across the imaging field of view. Furthermore, the XRD system may comprise a system topology that involves motion of the source and/or detector.

What is claimed is:

1. An explosives detection system, comprising:
   a housing comprising an entrance and an exit;
   a throughput conveyor extending through the housing; and
   an integrated, multi-sensor, screening device positioned within the housing between the entrance and the exit, the integrated, multi-sensor, screening device comprising:
   a non-rotational computed tomography system comprising a first distributed X-ray source and a first detector in a stationary configuration; and
   a non-translational X-ray diffraction system positioned inline with the computed tomography system,
   wherein the throughput conveyor extends through the computed tomography system and the X-ray diffraction system and is configured to transport an object through the computed tomography system and the X-ray diffraction system at a substantially constant conveyor speed during scanning of the object.

2. An explosives detection system in accordance with claim 1, comprising a reconstruction engine employing helical reconstruction processes for reconstruction of an entire volume of baggage being inspected for automated explosives detection.

3. An explosives detection system in accordance with claim 1, wherein the first distributed X-ray source comprises two or more sections providing a total azimuthal coverage sufficient for CT image reconstruction.

4. An explosives detection system in accordance with claim 3, wherein the sections are staggered along the direction of bag translation of the throughput conveyor.

5. An explosives detection system in accordance with claim 1, wherein the non-translational X-ray diffraction system has an inverse fanbeam geometry.

6. An explosives detection system in accordance with claim 1, wherein the computed tomography system is configured to acquire spectral data.

7. An explosives detection system in accordance with claim 6, wherein the first detector comprises an energy sensitive detector constructed from two layers of energy-integrating sensor material.

8. An explosives detection system in accordance with claim 6, wherein the first detector comprises an energy sensitive detector that is a photon counting detector.

9. An explosives detection system in accordance with claim 1, wherein the non-translational X-ray diffraction system comprises a second distributed X-ray source and a second detector in a stationary configuration.

10. An explosives detection system in accordance with claim 9, wherein the second distributed X-ray source utilizes one of wireless serial links and multiplexing technology to reduce a number of vacuum feed-throughs used to control multiple sources of the second distributed X-ray source.

11. An explosives detection system in accordance with claim 1, wherein the first distributed X-ray source utilizes one of wireless serial links and multiplexing technology to reduce a number of vacuum feed-throughs used to control multiple sources of the first distributed X-ray source.

12. An explosives detection system in accordance with claim 1, wherein the computed tomography system comprises a multi-slice detector comprising multiple detector modules spanning a predefined total X-ray fanbeam width and a predefined X-ray conebeam width.

13. The explosives detection system in accordance with claim 1, wherein a throughput of the explosives detection system exceeds about 100 bags per hour.

14. The explosives detection system in accordance with claim 13, wherein the throughput of the explosives detection system exceeds about 300 bags per hour.

15. The explosives detection system in accordance with claim 14, wherein the throughput of the explosives detection system exceeds about 700 bags per hour.

16. The explosives detection system in accordance with claim 13, wherein the throughput of the explosives detection system exceeds about 1,000 bags per hour.

17. The explosives detection system in accordance with claim 1, wherein the computed tomography system and the X-ray diffraction system are positioned in series along the throughput conveyor.

18. The explosives detection system in accordance with claim 1, wherein the computed tomography system is positioned within the housing adjacent the entrance and the X-ray diffraction system is positioned within the housing adjacent the exit.

19. A method for detecting explosives, said method comprising:

placing an object to be scanned on a conveyor that extends through a housing, wherein a non-rotational computed tomography system and a non-translational X-ray diffraction system are positioned within the housing such that the conveyor extends through the non-rotational computed tomography system and the non-translational X-ray diffraction system;

transporting the object through the computed tomography system and the X-ray diffraction system at a substantially constant speed;

scanning the object using the non-rotational computed tomography system during the transport of the object; and scanning the object using the non-translational X-ray diffraction system during the transport of the object.

20. A method for detecting explosives in accordance with claim 19, wherein scanning the object using the non-rotational computed tomography system comprises acquiring computed tomography projection data by electronically gating source locations within a distributed X-ray source of the non-rotational computed tomography system, the distributed X-ray source positioned about an imaging field of view.

21. A method for detecting explosives in accordance with claim 20, wherein electronically gating source locations within a distributed X-ray source comprises sequentially firing the source locations to mimic a helical scan.

22. A method for detecting explosives in accordance with claim 20, wherein the distributed X-ray source includes one or more sections, and electronically gating source locations within a distributed X-ray source comprises simultaneously firing one source location on each of the one or more sections to mimic multiple interlaces helices.

23. A method for detecting explosives in accordance with claim 20, wherein electronically gating source locations within a distributed X-ray source comprises firing a plurality of sources of the distributed X-ray source in a random pattern.

24. A method for detecting explosives in accordance with claim 19, further comprising:

processing data acquired with the computed tomography system; and after processing the data, queuing the X-ray diffraction system to interrogate regions of interest within the object that are suspicious.

25. A method for detecting explosives in accordance with claim 19, further comprising applying two-dimensional reconstruction techniques with filtered back-projection.

26. A method for detecting explosives in accordance with claim 19, wherein scanning the object using the non-rotational computed tomography system comprises scanning the object using a spectral computed tomography system.

27. A method for detecting explosives in accordance with claim 26, further comprising utilizing at least one of an effective atomic number estimate from the spectral computed tomography system and a molecular signature from the X-ray diffraction system to at least one of improve threat detection and reduce false alarms.

28. A method for detecting explosives in accordance with claim 27, wherein utilizing at least one of an effective atomic number estimate from the spectral computed tomography system and a molecular signature from the X-ray diffraction system comprises utilizing the molecular signature from the X-ray diffraction system to at least one of improve threat detection and reduce false alarms.

* * * * *